United States Patent [19]

Spiegel

[11] Patent Number: 5,200,071
[45] Date of Patent: Apr. 6, 1993

[54] TRANSLATING MAGNETIC FIELD TREATMENT DEVICE

[75] Inventor: Michael S. Spiegel, Miami Beach, Fla.

[73] Assignee: Quantum Systems International, Inc., Miami Beach, Fla.

[21] Appl. No.: 818,516

[22] Filed: Jan. 9, 1992

[51] Int. Cl.[5] ................................................ C02F 1/48
[52] U.S. Cl. .................................... 210/222; 210/695; 55/100
[58] Field of Search ................... 210/222, 695, 223; 417/50; 335/303, 304, 306; 55/100

[56] References Cited

U.S. PATENT DOCUMENTS

| 3,051,988 | 9/1962 | Baermann | 210/222 |
| 4,904,381 | 2/1990 | Urakami | 210/222 |
| 4,935,080 | 6/1990 | Hassell et al. | 335/303 |

FOREIGN PATENT DOCUMENTS

| 2819740 | 11/1979 | Fed. Rep. of Germany | 210/222 |
| 174555 | 7/1988 | Japan | 417/50 |
| 1537647 | 1/1990 | U.S.S.R. | 210/222 |

Primary Examiner—Matthew O. Savage
Attorney, Agent, or Firm—Herman J. Hohauser

[57] ABSTRACT

A fluid treatment system for changing the rates of growth of certain crystals and other solids formed within a fluid is disclosed herein. The apparatus includes a variable speed motor having a shaft, and a wheel assembly mounted on the shaft. The wheel assembly includes two circular ferro-magnetic disks separated from each other on the shaft a pre-determined distance to form a gap, and a ferro-magnetic spacer member concentrically arranged about the shaft and located in the gap between the disks. An array of magnets is concentrically arranged in a circular pattern about the shaft on the inner surface of each of the disks with the polarity of the inner pole faces of the magnets on one of the disks being the same as each other and the polarity of the inner pole faces of the magnets on the other of the disks being the same as each other but opposite to the polarity of the inner pole faces of said magnets on the one disk. An elongated fluid conduit having a U-shaped non-magnetic portion is located in the gap formed by the disks between the inner pole faces of the magnets, the U-shaped non-magnetic portion of the conduit being hollow so as to have no obstruction for continuous fluid flow therethrough, wherein sufficient magnetic force is provided by the combination of the strength of the magnets, velocity of the fluid, and rotation of the magnets to accomplish beneficial effects on impurities in the fluid.

3 Claims, 3 Drawing Sheets

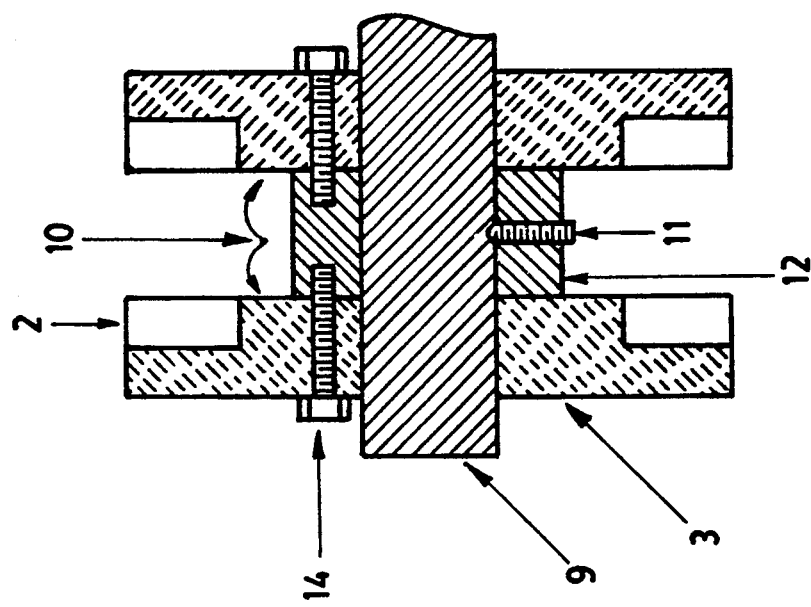
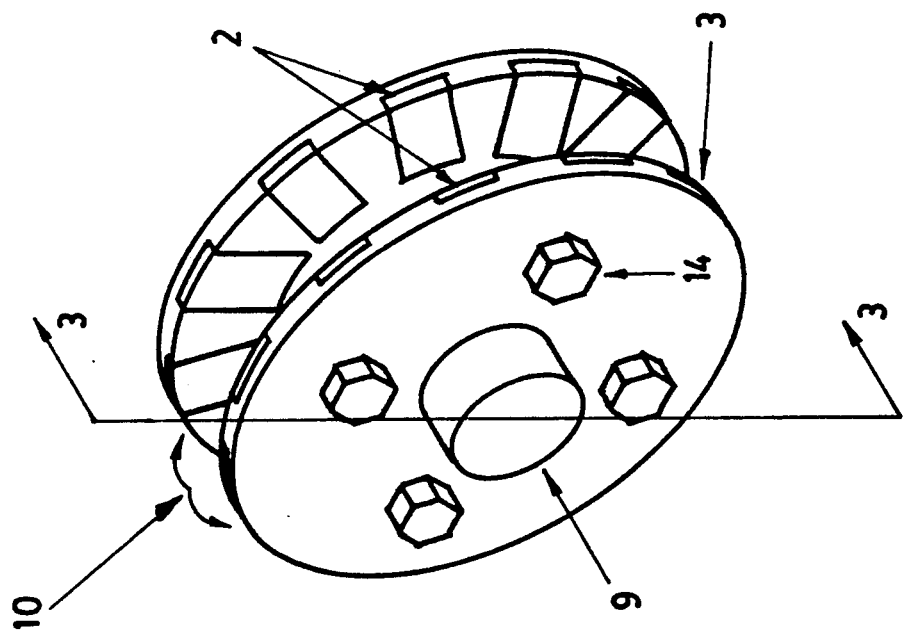

TRANSLATING MAGNETIC FIELD TREATMENT DEVICE

BACKGROUND OF THE INVENTION

1. Field of the Invention

This invention lies in the general field of fluid treatment, purification, and processing. More specifically this invention functions through the application of the a magnetic field on a fluid containing charged particles or ions, wherein the relative velocity of the particles perpendicular to the magnetic field lines produces a well known resultant force on the ions. Thus the invention is in the field wherein fluids are treated by means of a magnetic fields that induces ion movement through a Lorentz force phenomena.

The invention also lies in the general field of ion propulsion through the use of a moving magnetic field as is found in the area of plasma physics with certain applications concerned with rocket propulsion and controlled fusion. The application of this invention is not in these areas but is in a low energy regime with application for the redistribution of surface charges on small particles or aggregates of particles within the treated fluid.

2. Brief Description of Prior Art

There have been numerous designs for the magnetic treatment of fluids, specifically water, by inventors both in Europe and the United States. All previous designs utilized fixed or oscillating magnetic fields not spatially translating magnetic fields aligned transverse to the direction of fluid flow. Minerals dissolved in the fluid to be treated appear as suspended charged particles (ions). Ions moving solely with the fluid's velocity through a magnetic field are acted on by a force known as the Lorentz force. This force is usually stated in vector form as:

$$F_L = J \times B$$

Where $F_L$ is the Lorentz Force vector, J the current vector or charges, q, moving at Velocity V, and B the Magnetic Field vector. This equation may be rewritten as: $F_L = qV \times B$. Since the charge, q, can be either positive or negative the Lorentz force $F_L$, will be perpendicular to the plane of the two vectors, V and B, but in or out of that plane depending on the charge.

The foregoing is well known and has been the basis of most of the prior art in this field. In numerous cases it has been determined by various persons that the induction of a Lorentz force in a fluid has resulted in the reduction and prevention of the formation of various encrusting mineral scale formations on the interior portions of fluid conduits. The most well known and cited example being that of calcium carbonate, where the hard scale deposit know as calcite is converted to a soft loose sludge, which is easily removed. The benefit of this art is to prevent the loss of the system's efficiency through losses in both the rate of flow of the fluid and heat transfer by the fluid through the conduit walls due to the constriction and insulation caused by the scale build up.

Hertzog U.S. Pat. No. 4,946,590 discloses a water treatment device consisting of permanent magnets clamped on a conduit so that the direction of the fixed field is perpendicular to the flow of the fluid. This is typical of many devices that are in use all over the world. It is claimed, without a detailed physical argument, that a reversal of the magnetic field along the fluid flow path is beneficial. It makes use of the Lorentz force to produce the results mentioned above, but does not explain the physics of the process beyond a mention of ion agitation and depends totally on the velocity of the fluid to create the effect.

There are a number of similar applications of this art. Moody U.S. Pat. No. 3,228,878 is a permanent magnet device that has no field reversal and fixed permanent magnets. Green et al U.S. Pat. No. 2,939,830 has an field reversal using an electromagnet and alternating current. Granger U.S. Pat. No. 4,229,389, Fujita U.S. Pat. No. 4,188,296, Mitchell U.S. Pat. No. 4,755,288 and Carpenter U.S. Pat. No. 4,367,143 make use of fixed magnetic fields that and claim to improve and enhance the quality and utility of a variety of fluids.

Brigante in U.S. Pat. Nos. 4,347,133; 4,148,731; 4,151,090; and 4,288,323 teaches a helical geometry for the flow of a fluid within a cylindrical conduit in which a fixed axial magnetic field has been induced by means of an electromagnet. In this case the Lorentz force is achieved by the circular component of the fluids velocity which is perpendicular to the axial magnetic field. Claims of efficacy in cleaning ground water, separating fine solids, and removing magnetic particles are made. No spatially translating magnetic field is used.

Each of the foregoing patent disclosures, and foreign patents: SU 1430357A Russian; ETA 0277524 German; 46-2639 Japan; and 1212969 Russian, all are of the type wherein Lorentz forces are induced by fluid velocity alone. They are incorporated in the teachings of the current patent only in that the show the efficacy of such treatment to reduce calcareous scale accummulations and other benifits. In no instance does any of this art suggest the use of spatial translation of magnetic fields to produce a relative velocity of the fluid to the magnetic field. No concise and clear cut explanation of the physical or chemical processes involved is proffered by any of these teachings beyond a vague reference to Lorentz force initiation and ion agitation.

A second area of prior art is that which deals with applications of moving magnetic fields. Though no art was found that described the use of moving magnetic fields transverse to conduits of fluid to produce Lorentz force treatment of nonmagnetic particles suspended in the fluid, there are some teachings on moving fields. Dudnik et al Russian Inventor's Certificate No. SU 0722576 teaches a moving solenoidial magnetic field that is axial, not transverse, to the fluid conduit and moves parallel to the axis thus inducing no Lorentz force. The purpose of the solenoid magnetic field is to remove ferromagnetic particles only, and not to effect ion transport or provide any other benefit.

All prior art has relied to varying degrees on an assumption that the introduction of magnetic fields to fluids flowing in a conduit would induce some benefit. Grutsch and McClinctock in Paper No. 330 in the Corrosion '84 conference sponsored by the National Association of Corrosion Engineers, (NACE), provide a survey of numerous applications of magnetic water treatment. They describe four different geometries employed to achieve treatment. In all cases the magnetic fields were fixed and not subject to spatial translation. No concise theories are offered as to the process involved, but support for the theoretical arguments that no physical change can be induced in the water molecule, itself, by magnetic fields are reiterated.

Busch et al in Paper No. 251 in NACE Corrosion '85 conference describe experiments preformed at Baylor University in which a permanent magnet water treatment system was tested. There results show the presence of weak induced electric potentials and currents, with clear dependence on fluid flow rates. A number of hypotheses were suggested that were dependent on the induction of the measured electric current, but no definitive argument could be made for any of the vague models proffered.

The most significant advance in the understanding of the phenomenon heretofore, is given by Donaldson and Grimes in the Feb. 18, 1988 issued of the New Scientist, published in England. In that and two other papers: Donaldson in January 1988 Tube International; and Grimes in March 1988 Tube International, detailed evidence is provided on the changes in crystal morphology, phase, growth rates, and solubility. Shown conclusively, through the use of electron and optical microscopy, and X-ray diffraction analysis, are the comparative results of magnetic treatment of hard water using a permanent magnetic flow through device. Comparative micrographs clearly show dramatic changes of the suspended crystals after magnetic treatment. A sixteen fold reversal of the ratios for the calcium carbonate crystal phases, calcite and aragonite, was shown. This is of particular importance in that it provides a link in the causal argument of how calcite scale build up is removed from systems.

Donaldson and Grimes offer three possible modalities for the observed effects. Turbulence induced by the physical geometry of the treatment apparatus may have some small effects, but analysis shows it to be of lower order than that of observed results. Collision processes attributed to the Lorentz force are argued to be also of lower order. They attribute the primary cause to be that of changes induced on the surfaces of crystal nuclei. "The magnetic field acts at the surface of the crystallites, modifying the nature of the charges at the surface. This alters the growth of the crystals in general and on specific planes. Such a modification of the way nuclei form around which crystals grow explains everything we have seen." They further state, "At the interface between solids and fluids, diffusion layers arise between the solution and the faces of the growing crystal. The growing faces each carry a distinctive charge. How the magnetic field affects the surface of the crystal and the diffusion layer is critical."

In all previous teachings on this art there has been no introduction of translating magnetic fields. The work by Donaldson and Grimes is the key to understanding how the process works, yet, they have not worked out the details of the surface processes. It is the actual force and energy constraints on the surfaces that control the event thresholds and rates for the formation of crystal surfaces. Our research has revealed a theory that allows the calculation of these key parameters. The embodiment presented herein allows the fine tuning and high range of variation that bring the fullest application of this technology to the widest range of phenomena.

SUMMARY OF THE INVENTION

A unitary system comprised of multiple pairs of permanent rare earth magnets arranged in a circular array on the circumference of a wheel. The rim of the wheel is shaped like a "U". The magnets on one inner surface of the "U" are comprised of all north magnetic poles. The opposite inner surface is comprised of all south magnetic poles. Thus the space between the two inner surfaces consists of an endless series of closely spaced transverse magnetic fields. The wheel is mounted on an electric motor with a variable speed adjustment that allows a wide assortment of rotary speeds.

A nonmagnetic conduit is fitted to the curve of the wheel so that it lies within the gap of the "U" shape of the rim for up to 360 degrees of the circle made by the wheel. Various applications may require as little as a single tangent convergence of the conduit and the wheel. As the wheel turns the magnetic field lines of the permanent magnets cut through the conduit and the fluid therein. The velocity of the field lines through the fluid is:

$$V = 2\pi r \phi + V_f$$

Where, $\phi$ is the radial velocity, r is the radius, and $V_f$ is the velocity of the fluid through the conduit. Typically the velocity of the magnetic field due to the rotational velocity times the radius will be much much greater than the flow velocity, $V_f$. Thus it is possible to treat fluids that have very low, or even zero velocity.

Using Neodymium-Iron-Boron ($Ne_2Fe_{14}B$) rare earth magnets it is possible to achieve magnetic fields in the gap between the magnetic poles on the order of 1000 gauss and larger. Such fields coupled with the velocities generated by standard electric motor rotational speeds of 3600 RPM and assemblies with a radius of four inches (4") allow Lorentz forces that are 50 to 100 times greater than can be achieved using any of the prior art.

Prior art has shown that systems using magnetic fields to create a Lorentz force in a fluid produce desired results in the area of scale prevention and removal. There is also anecdotal evidence that supports the use of the treatment to prevent alga, as a biocide, and to speed up the settlement time for colloids in treated sewerage. None of the prior art, with the exception of Donaldson and Grimes offer any plausible set of causal relations that can explain the results, and their work is limited in its scope to speculation as to the details of process.

I now disclose that the specific function that governs the effects of the magnetic field treatment of fluids or gasses is the Surface Work Function, $\omega$, the energy that bonds a single electron to a surface that is unique to a given aggregate of particles that form the surface. All charged particles are acted on by the Lorentz force, but the heavier ion clusters, composed of many protons and neutrons, are many thousands of times more massive than a single electron. Thus, the only significant velocities are imparted to electrons.

Micells, micro-crystals composed of less than one hundred molecules, larger suspended crystal structures, and the surfaces of very small suspended colloids carry a surface charge due to electrons that reside on the solid's surface. Each electron is bound to by an $\omega$ that is dependent on the composition and structure of the micro-solid. Depending on the initial condition of the fluid to be treated the surface charge of the various types of micro-solids may be attractive, repulsive, or neutral to an incoming ion.

In the case of crystal structure, a micro-crystal or crystal nucleus, acts as the core for the build up of a crystal. As ions of the same chemical that constitutes the building blocks of the crystal lattice collide with the surface of the crystal some will bond at the proper orientation to the existing lattice and add to the surface of the crystal. It is this interaction between the crystal lattice surface and the incoming ion that is critical to the rate of growth and morphology of the lattice. It is clear that the interaction between the charged ion and a charged surface is dominated by electrostatic forces. The electrostatic surface charge on a lattice will effect the orientation of incoming ion due to its electric dipole moment. Since the ion will only bond to the lattice if it collides with the surface at the proper orientation to allow the molecule to fit into the existing lattice pattern, the probability for each collision to add to the crystal is controlled by the surface charge of the crystal. Thus any change in the number of electrons residing on a given crystal surface will change the interaction probabilities that determine the future growth of that crystal.

The Lorentz force produced by a relative velocity of charges perpendicular to a magnetic field acts primarily on electrons to move them through the fluid. Most electrons are bound either to ions, molecules, or the surfaces of solids. Electrons bound to surfaces are less tightly bound than those in even the highest energy levels of a molecule. Typically the first ionization energy of an electron is three to ten times that of its Work Funtion, $\omega$, when that same element or compound is formed into a lattice. As an example the element carbon has a first ionization of 11.2 ev, a second ionization of 24.3 ev, and a $\omega=4.0$ ev (Thermionic Work Function). Thus significantly smaller energies may free electrons from a surface than would be required to ionize an S or P shell electron from a singular molecule.

The electrons on the surface of crystals will have a distribution of kinetic energies that are dependent on the temperature of the fluid, some will need much less energy input to over come the $\omega$ of come the $\omega$ of the crystal. The redistribution of only a few electron charges will change the probability of crystal formation. The weak energy interaction of the Lorentz force, if greater than crystal's $\omega$, is enough to shift probability, and rate of formation of a crystal phase.

A specific example of how this process works is demonstrated by the conversion of the crystal phases in calcium carbonate, calcite and aragonite. Both calcite and aragonite are chemically identical, $CaCO_3$, but form two different crystal phases. Calcite is has a slightly lower lattice energy than agaronite and is found in higher concentrations by a radio of 4 to 1. After Lorentz force type magnetic treatment Donaldson and Grimes reported a reversal of concentration so that one calcite crystal was formed to four aragonite crystals. This increase in the aragonite concentration by 1600%. Since the amount of energy required to disassociate the calcite and form the aragonite is at least two orders of magnitude greater than the energy added to the system by the magnetic treatment we must find an indirect causal chain that will explain this phenomena.

We know, from the preceding discussion, that a small number of electrons will be shifted to or from the surfaces of the the existing micro-crystals. This slight change in surface charge will cause those crystals to grow as aragonite. This explains how one phase is increased but not how the previously dominant calcite is reduced. It is well known that, when the partial pressure of ions forming a crystal in a solution is reduced, a crystal exposed to that solution will dissolve back into that solution. Thus, as the newly dominant aragonite absorbs the Ca and $CO_3$ ions from the solution, it reduces the partial pressure of these ions on the existing calcite crystals breaking the existing equilibrium condition and causing the calcite to dissolve into Ca and $CO_3$ ions which reform as aragonite. Thus we can see how a very weak interaction causing a slight modification of charge distribution can produce a dramatic change within the solution.

It was necessary to understand the process by which all changes within a magnetically treated fluid are caused in order to understand the significance of the function of the invention. This invention allows control over an extremely wide range of the Lorentz force that couples with the electrons in the treated fluid. Adjustment of the rotational velocity, $\Omega$, and the radius of the moving magnets can achieve a continuous variation in the energy imparted to the surface electrons. This wide range tuning capacity allow the selection of those $\omega$'s which will determine the group of micro-solids to be affected. This is a clear improvement on all previous magnetic treatment which is limited by low relative velocities of magnetic field to the fluid by pump pressure, surface friction, and form drag of various flow restriction devices inserted into the conduit where the fluid is treated. It further improves on previous teachings in that it allows the treatment of fluids that are slow moving or even at rest in the conduit. The most significant improvement is that previous teachings have an upper limit on the critical Lorentz force component, $|V \times B| \approx 10,000$ gauss meters/sec, where this teaching allows a $|V \times B| \approx 1,000,000$ gauss meters/sec, or a multiple of 100 times the previous teachings.

OBJECTS OF THE INVENTION

The objects of this invention share one common casual pattern. It is the treatment of solids of all compositions that are suspended within the fluid or gas within the magnetic array.

It is an object of this invention to treat all manner of fresh water that is used in cooling towers, boiler systems, food systems, waste systems, and chemical processing to prevent and remove the build up of scale or other precipitate that might block pipes or conduits within the system.

It is a further object of this invention to treat all manner of fresh water that is used in cooling towers, boiler systems, food systems, waste systems, and chemical processing to prevent and remove the build up algae and unwanted or dangerous bacteria.

It is a further object of this invention to provide pretreatment to salt water desalination systems to enhance efficiency by removal of salts.

It is a further object of this invention to enhance both the rate of formation and quality of industrial crystals.

It is a further object of this invention to mix and stabilize oil and water emulsions to allow for long term storage and higher fuel economy through greater combustion efficiency.

It is a further object of this invention to treat medical disorders that can be ameliorated by changing the quantitative make up of minerals, salts, and colloids that exist within the various parts of the human body. It is a further object of this invention to increase the speed and efficiency of sewage treatment by increasing the rates of compaction and settling of suspended colloids.

Other and further objects will be apparent from the drawings and following descriptions.

BRIEF DESCRIPTION OF THE DRAWINGS

FIG. 2 shows a perspective view of the combined wheels with the permanent magnets installed;

FIG. 3 is a sectional view along line 3—3 of FIG. 2;

DESCRIPTION OF THE PREFERRED EMBODIMENTS

Figure 1:
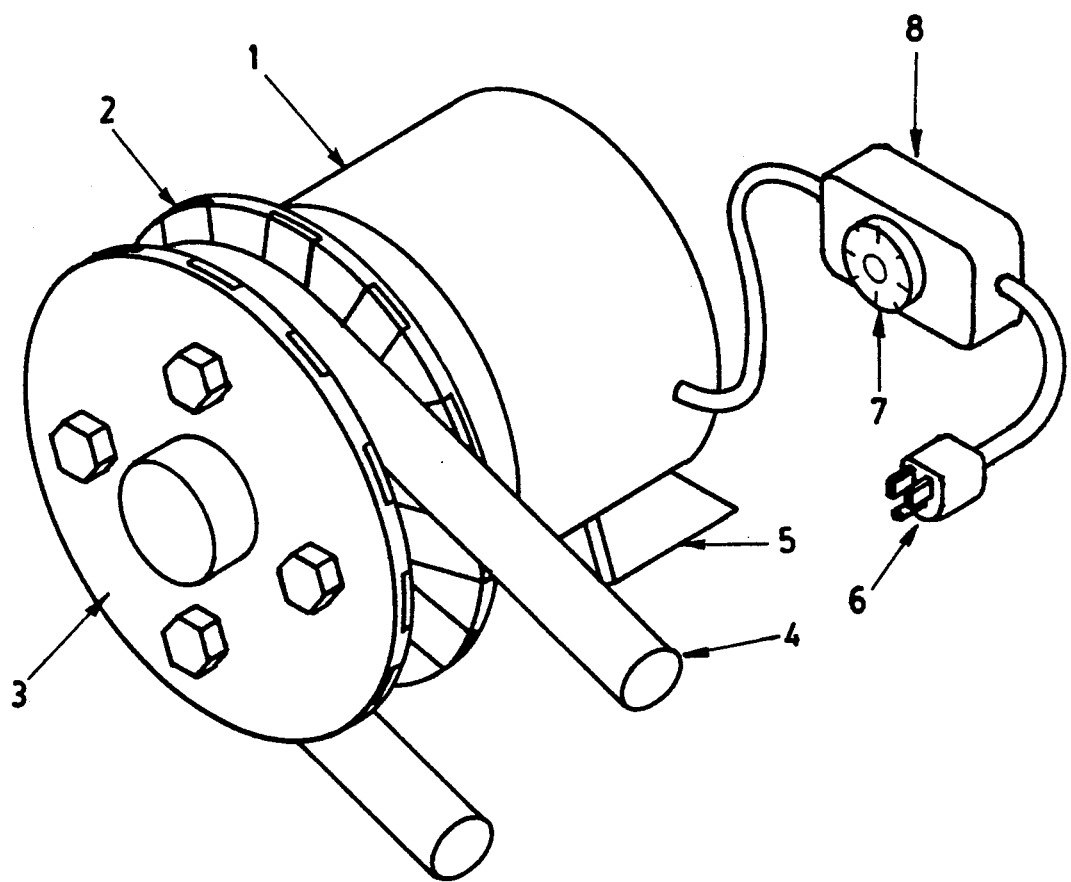
FIG. 1 shows a perspective view of the preferred embodiment of the invention. It shows the electric motor which drives the double wheels with mounted permanent magnets. The magnets envelope a conduit that carries the treated fluid. The motor is connected to an electric controller that varies motor speed.

The invention consists of a unitary package, shown in FIG. 1. The electric motor 1 is connected to a speed control unit 8 which is adjustable through a full range of speeds from 50 to 3450 RPM by means of knob 7. The system is powered by conventional electric power through connection 6. The rotation of the motor is translated to the wheel assembly 3 by means of a direct shaft connection 9 in FIGS. 2 and 3. Permanent Neodymium Iron Boron magnets 2, are mounted on the wheel assembly in such fashion that each set of magnets 2 in FIG. 2 are directly opposite each other and arranged so that all "north" poles reside on one inner face of the gap 10 of FIGS. 2 and 3, and all "south" poles reside on the opposite inner face of gap 10. Thus magnets 2 are attracting in all cases. Supports 5 on each side of the motor 1 provide a rigid mount and sufficient clearance for free rotation of wheel 3 and assembly of conduit 4. Conduit 4 shown in FIG. 1 carries the fluid that is treated by the moving magnetic flux as it passes through the conduit which is located in gap 10 while the wheel 3 rotates. That portion of conduit 4 that lies within gap 10, and is less than six inches (6") from the rim of the wheel 3, shall be made from a non-ferromagnetic material of low magnetic permeablilty. The fluid is moved through the conduit from its source and then returned to its system by means of external pumping methods.

Though conduit 4 in FIG. 1 is formed in a "U" shape and fitted closely within gap 10, there may be many applications wherein the conduit need only pass within the moving magnetic fields of the gap 10 in a tangential manner. Thus, in such cases, the conduit will run straight and no turn or deflection of the piping will be required. A further modification is that more, or less, of the magnet pairs 2 may be installed on the wheels 3. As larger wheels 3 are used for various conduit sizes and applications, no upper limit on the number of magnet pairs 2 can exist other than the physical limits of the space on the inner surface of wheels. Even a single pair of magnets 2 may be sufficient for some applications.

The section of conduit 4 that lies within the gap 10 should be constructed of nonmagnetic material so that the magnetic field flux may freely permeate the fluid contained. Conduit leading to this susceptible to magnetization it must be a minimum of one foot (1') from the rim of the wheel 3.

The wheel assembly shown in FIGS. 2 and 3 consists of two circular iron plates 3 separated by an iron spacer 12. The iron plates 3 are fitted with opposite pole permanent magnets 2 and bolted together with bolts 14 into threaded holes in the iron spacer 12. The purpose of the iron construction is to insure maximum magnetic flux in gap 10 by providing a magnetic media to retain the maximum flux in the magnetic circuit. This double wheel assembly is fitted onto the electric motor shaft 9 and made fast to the shaft by set screw 11. Other means of attachment are possible.

Figure 5:
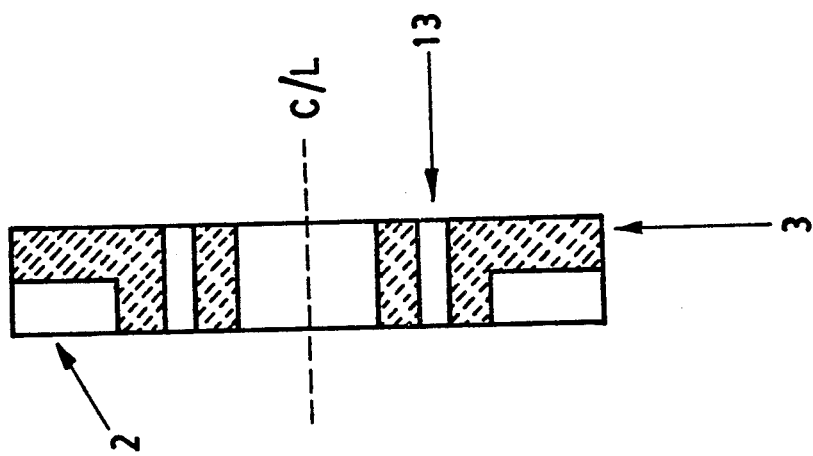
FIG. 5 is a sectional view along line 5—5 of FIG. 4.
Figure 4:
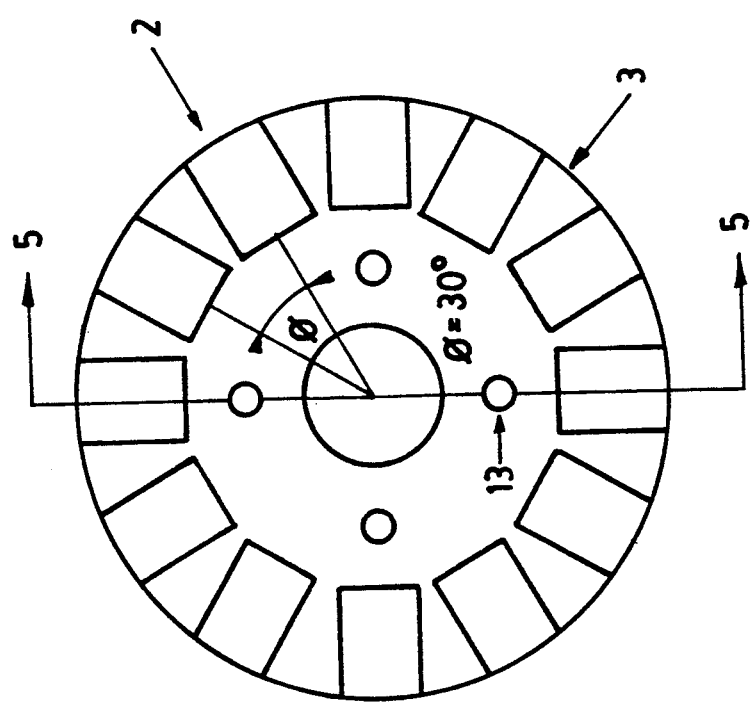
FIG. 4 is the plan front view of one wheel section with the permanent magnets attached at a spacing of 30°.

Each wheel plate 3 as shown in FIGS. 4 and 5 is a flat circular iron plate with cutout portions on the rim to accommodate permanent magnets 2. In FIGS. 4 and 5 a total of twelve (12) $1''\times1''\times0.5''$ permanent magnets 2 are equally spaced, at 30° on center, around the outer rim of the plate. This is an optimum for an 8" diameter wheel, but may vary for other physical considerations such as conduit size, and applications such as $CaCO_3$ removal or waste treatment. Holes 13 are equally spaced around the interior of the plate 3 to provide access for the bolts 14 that fasten the plates to the spacer 12. A hole 15 is provided for motor shaft 9. The permanent magnets 2 are fastened into each cutout slot with epoxy glue and are coated with epoxy paint to prevent loss of magnetic strength due to oxidation. The permanent magnets on each plate will all have the same polarity, that is, each permanent magnet on one plate 3 will have a "north" pole facing the open gap 10. All the permanent magnets on the opposite plate 3 will have a "south" pole facing the open gap 10. Thus the field across the gap 10 and through the conduit 4 will be a continuous and attractive field.

I claim:

1. A fluid treatmemt system for changing the rates of growth of certain crystals and other solids formed within a fluid comprising:

a. and electrical power source;

b. a speed control unit connected to said power source, said unit having an adjustable knob;

c. a motor connected to said speed control unit, and having a rotatable shaft;

d. a wheel assembly mounted on said shaft consisting of two circular ferro-magnetic disks separated from each other on said shaft a pre-determined distance to form a gap, said disks being oriented perpendicular to and being concentrically mounted about said shaft, each said disk having an inner surface facing said gap;

e. a ferro-magnetic spacer member concentrically arranged about said shaft and located in said gap between said disks, said spacer member having a pair of spaced apart ends, a respective said end of said spacer member contacting a respective said inner surface of said disks;

f. an array of magnets concentrically arranged in a circular pattern about said shaft on a said inner surface of each of said disks, each said magnet having an inner pole face facing the gap, each magnet having a polarity parallel to a longitudinal direction of said shaft, the number of said magnets on each said disk being equal, each respective said magnet on one of said disks being located directly opposite to a respective said magnet on said other disk;

g. the polarity of the inner pole faces of said magnets on one of said disks being the same as each other and the polarity of the inner pole faces of said magnets on the other of said disks being the same as each other but opposite to the polarity of the inner pole faces of said magnets on said one disk;

h. an elongated fluid conduit having a U-shaped nonmagnetic portion located in the gap formed by said disks between said inner pole faces of said magnets, wherein fluid flows in said conduit through said gap in a continuous flow into and out of said gap;

i. said U-shaped non-magnetic portion of said conduit being hollow so as to have no obstruction for continuous fluid flow therethrough, wherein sufficient magnetic force is provided by the combination of the strength of the magnets, velocity of the fluid, and rotation of the magnets to accomplish beneficial effects on impurities in the fluid.

2. The fluid treatment system of claim 1 wherein said magnets are attached to said disks with epoxy glue, said glue coating said magnets to prevent oxidation.

3. The fluid treatment system of claim 1 wherein said magnets are located in slots formed in said inner surfaces of said disks.

* * * * *